(No Model.)
N. JEWETT.
APPARATUS FOR CLEANING AND GRADING GRAVEL, ORE, &c.
No. 475,568. Patented May 24, 1892.
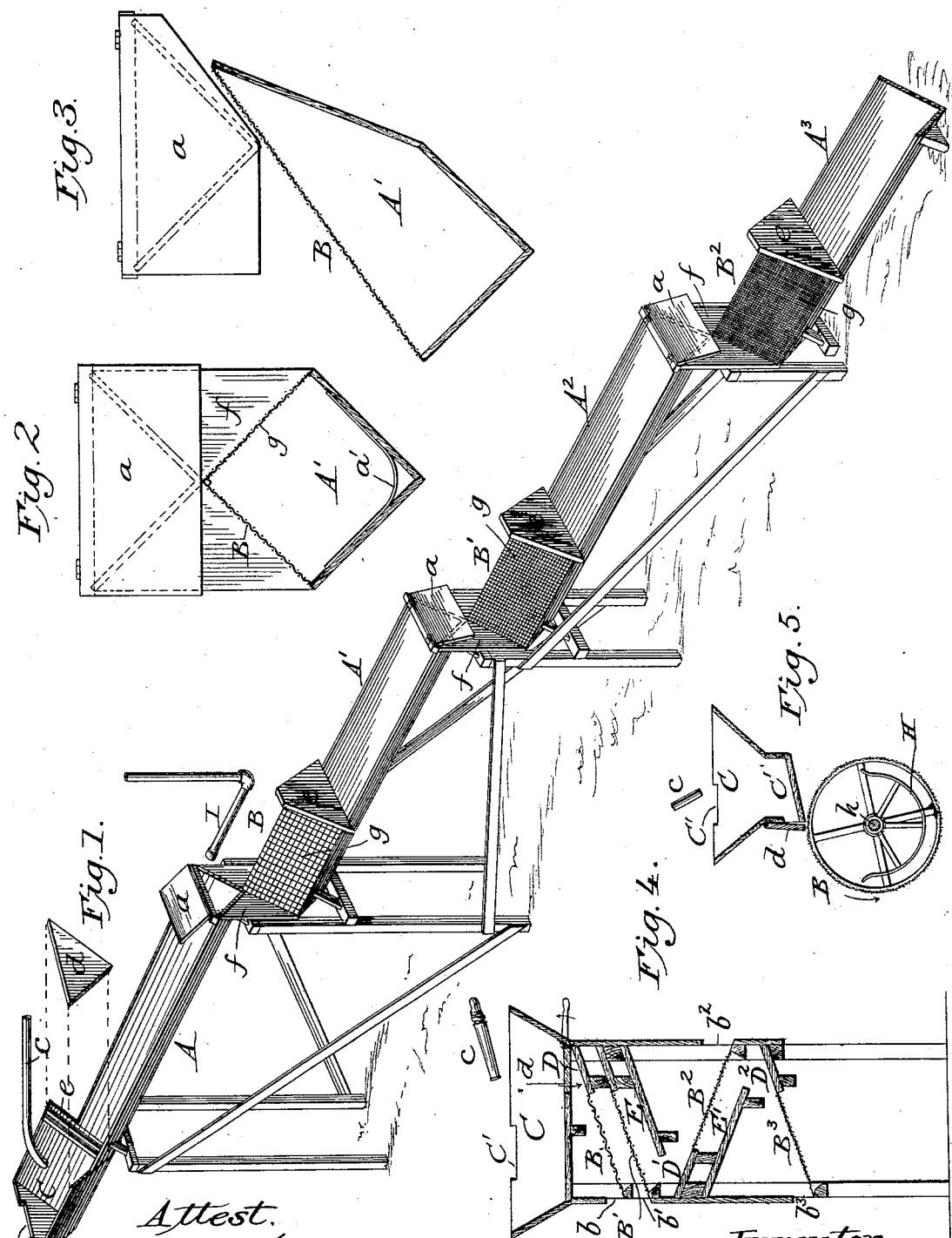
Attest.
Sidney P. Hollingsworth
G. M. Copenhaver
Inventor.
Nathan Jewett

UNITED STATES PATENT OFFICE.

NATHAN JEWETT, OF CHICAGO, ILLINOIS.

APPARATUS FOR CLEANING AND GRADING GRAVEL, ORE, &c.

SPECIFICATION forming part of Letters Patent No. 475,568, dated May 24, 1892.

Application filed February 9, 1891. Serial No. 380,776. (No model.)

*To all whom it may concern:*

Be it known that I, NATHAN JEWETT, a citizen of the United States, residing at Chicago, in the county of Cook and State of Illinois, have invented a new and useful Apparatus for Cleaning and Grading Gravel, Ore, &c., of which the following is a specification, reference being had to the accompanying drawings, forming a part hereof.

In my apparatus I arrange a series of chutes to discharge each into the next and supply the first with the material to be treated and with a constant supply of water sufficient to cleanse and agitate the material and sweep it forward through the successive chutes, and between each chute and the next I locate a screen laterally inclined or otherwise arranged, so that while the water and fine material pass through to the next chute the coarser matters are arrested and automatically discharged by the screen. I also make use of a deflector or spreader at the end of each chute to act upon the outgoing stream and spread the same upon the screen.

In the accompanying drawings, Figure 1 is a perspective view of my apparatus in its approved form for separating or grading the material into four sizes. Fig. 2 is a cross-section of the same on the line 2 2 of Fig. 1. Fig. 3 is a cross-section illustrating the screen in another form. Fig. 4 is a vertical section of the apparatus with a series of screens arranged one above another. Fig. 5 is a transverse section of the machine in still another form.

In Fig. 1, A, A', A², and A³ represent a series of chutes or troughs made, preferably, of V form in cross-section, as shown, and arranged rigidly upon supports at different levels in such position that each will deliver at one end into the end of the next. These chutes may be and preferably are arranged at an inclination in the direction of delivery; but when a very large volume of water is used good results may be obtained when they are arranged in horizontal positions. The receiving end of the first chute A is fashioned into a hopper C, into which the material to be treated is primarily delivered and from which its passage is controlled by a gate *d*. A pipe *c*, communicating with a dam, pump, or other source of supply, delivers a stream of water constantly into the hopper C, in order that it may wash the adhering impurities from the gravel or other material and sweep the entire mass of material forward through the delivery end of the chute. This stream is preferably projected with considerable force into the hopper, in order that it may the more effectually loosen and eject the material.

Between the delivery end of each chute and the receiving end of the next I locate a screen *g*, having a sharp lateral inclination in both directions, as shown in Figs. 1 and 2, or in one direction, as shown in Fig. 3, so that as the stream of water and granular material issues from each chute it is received upon a screen, through which the water and finer materials pass into the next chute, while the coarser materials lodging upon the outer sharply-inclined surface are caused to roll off laterally outside of the chute. The series of screens will be suitably graded, each finer than its predecessor, so that in the course of the material through the system it is first separated, the next finer removed at the second operation, and so on repeatedly, the finest material adapted to pass through all the screens being carried through the successive chutes and finally delivered from the last chute with the water. It is to be observed that the water and the fine material pass through the entire length of the apparatus, and that the water and the material carried thereby, striking upon the inclined screens, serve to dislodge the coarse material thereon and to insure its delivery, so that the meshes of the screens are kept at all times clear and in operative condition.

In practice I find that it is advisable to spread the water and the contained matters delivered from the chutes over the surface of the screens, and for this purpose I provide at the delivery end of each chute a deflector or spreader *a*, preferably in the form of a gravitating board hinged at its upper end, as shown. It is found that this spreading serves an excellent purpose in securing a thorough and uniform distribution of the material and an effective action of the water thereon.

The form of apparatus represented in Fig. 4 involves a mode of action very similar to that of the first, although the parts are differently arranged. It consists of an upright frame, having at the top a hopper C to receive the crude material, a pipe $c$ to deliver water thereto, and a gate $d$ to control the discharge of the material from the bottom of the hopper. B, B', B$^2$, and B$^3$ are a series of screens mounted ridgily in the frame below the hopper and arranged—except the top pair, which may be parallel, as shown—one above another in a zigzag or serpentine manner, the lower end of each arranged to deliver the coarse material or tailings from the side of the apparatus through openings $b\ b'$, &c., provided for the purpose. At the head of the several screens there are inclined boards or deflectors D D' D$^2$, and under the upper screens there are located reversely-arranged boards E E', which serve to receive the water and material falling through one screen and direct them against the underlying deflector, by which they are spread and delivered to the next screen. It will be perceived that in this apparatus, as in the first, the coarse materials are arrested and automatically delivered by the laterally-inclined screen, that the entire body of water and fine material pass through the entire series of screens, and that the water serves as the sole means of advancing the material through the apparatus and of insuring the delivery of the coarse material from the surface of the screens.

In the apparatus shown in Fig. 5 a hopper C is located beneath the water-supply pipe $c$ and provided with an outlet-opening $c'$, through which the water and material are delivered upon the upper surface of a horizontal cylindrical rotating screen C$^5$, within which there is suspended a chute or trough H. The water loosening and washing the material flows therewith from the hopper onto the upper surface of the screen C, upon which the coarse materials lodge and over which they pass, while the finer material and the greater part of the water pass through to the interior, where they are received in a chute, which delivers them from the end of the screen. The current from the hopper serves to impart a constant rotary motion to the screen, thus insuring the dislodgment of all material resting thereon.

It is to be particularly noted that in my apparatus the various screens are set at a sharp angle of inclination from the vertical, so that the materials lodging thereon may be certain to pass over the ends without the necessity of shaking the screen. The water, which is used in large volume and permitted to pass violently through the machines, serves, among other objects, to dislodge matters which may tend to remain upon the screen and compel their passage thereover.

What I claim is—

1. The combination of inclined imperforate chutes discharging one into another, means for supplying a constant and heavy volume of water to the uppermost chute, and a stationary screen located between one chute and the next and having a sharp lateral inclination, whereby the entire volume of water entering the head of the apparatus is caused to pass through all of the chutes and screens, carrying before it the material under treatment and causing the screens to separate and deliver the coarse materials without the use of movable parts or the employment of a motor.

2. The combination of a sharply-inclined chute, a fixed inclined screen to which it delivers, means for delivering a constant volume of water to the chute to advance the material through the chute and over the screen, and a deflector located between the chute and the screen to spread the falling material and water over the latter.

3. In combination with the chute, means for supplying the water thereto, and the screen inclined to deliver the coarse material automatically, the gravitating deflector hinged at the delivery end of the chute.

4. In an apparatus for washing and grading gravel, &c., two V-shaped chutes discharging one into the end of the next, in combination with the stationary screen arranged over the upper end of the lower chute and laterally inclined to discharge the coarse material, and means for delivering water into the upper chute.

In testimony whereof I affix my signature in presence of two witnesses.

NATHAN JEWETT.

Witnesses:
HENRY E. COOPER,
MARGARET V. COOPER.